United States Patent [19]
Yoshida et al.

[11] Patent Number: 5,603,908
[45] Date of Patent: Feb. 18, 1997

[54] PROCESS FOR REMOVING CARBON DIOXIDE FROM COMBUSTION GASES

[75] Inventors: Kunihiko Yoshida; Tomio Mimura; Shigeru Shimojo, all of Osaka; Mutsunori Karasaki; Masaki Iijima, both of Tokyo; Touru Seto; Shigeaki Mitsuoka, both of Hiroshima-ken, all of Japan

[73] Assignees: The Kansai Electric Power Co., Inc., Osaka; Mitsubishi Jukogyo Kabushiki Kaisha, Tokyo, both of Japan

[21] Appl. No.: 651,501

[22] Filed: May 22, 1996

Related U.S. Application Data

[63] Continuation of Ser. No. 358,541, Dec. 14, 1994, abandoned, which is a continuation-in-part of Ser. No. 120,759, Sep. 15, 1993, abandoned.

[30] Foreign Application Priority Data

Sep. 16, 1992 [JP] Japan ..................................... 4-246394

[51] Int. Cl.⁶ .................................................. B01D 53/62
[52] U.S. Cl. ........................... 423/220; 423/226; 423/228
[58] Field of Search .................................... 423/220, 226, 423/228

[56] References Cited

U.S. PATENT DOCUMENTS

| | | | |
|---|---|---|---|
| 4,112,052 | 9/1978 | Sartori et al. | 423/228 |
| 4,217,236 | 8/1980 | Sartori et al. | 252/189 |
| 4,251,494 | 2/1981 | Say | 423/228 |
| 4,405,577 | 9/1983 | Sartori et al. | 423/223 |
| 4,409,191 | 10/1983 | Osman | 423/220 |
| 4,702,898 | 10/1987 | Grover | 423/220 |
| 4,857,283 | 8/1989 | Madden, II | 423/228 |
| 4,997,630 | 3/1991 | Wagner et al. | 423/228 |

FOREIGN PATENT DOCUMENTS

| | | |
|---|---|---|
| 0102712 | 3/1984 | European Pat. Off. . |
| 0544515 | 6/1993 | European Pat. Off. . |
| 4-21521 | 4/1992 | Japan . |

OTHER PUBLICATIONS

"Chemical Engineering Techniques" by B. E. Lauer et al; Reinhold Pub. Co. 1952; USA, pp. 406–407 (No Month).

*Primary Examiner*—Gary P. Straub
*Assistant Examiner*—Timothy C. Vanoy
*Attorney, Agent, or Firm*—Jacobson, Price, Holman & Stern, PLLC

[57] ABSTRACT

A process for removing $CO_2$ from a combustion gas which comprises removing $CO_2$ from the combustion gas through contact of an aqueous hindered amine solution used as a $CO_2$ absorbent solution with the combustion gas at atmospheric pressure and then, in a regeneration column, liberating $CO_2$ from the absorbent solution that has absorbed $CO_2$ by heating it and thereby regenerating the absorbent solution. The process further comprises a partial absorbent solution regeneration step in at least one stage wherein the absorbent solution that has absorbed $CO_2$ is heated through heat exchange with a high-temperature regenerated absorbent solution and part of the $CO_2$ that is liberated is separated from the absorbent solution. Following this, according to the necessity, part of the partially regenerated absorbent solution thus obtained is returned to the step of removing $CO_2$ from the combustion gas for use as part of the $CO_2$ absorbent solution while the rest or all of the absorbent solution is heated and fed to a regeneration column further to liberate $CO_2$ and regenerate the absorbent solution.

6 Claims, 4 Drawing Sheets

PROCESS FOR REMOVING CARBON DIOXIDE FROM COMBUSTION GASES

This is a Continuation of application Ser. No. 08/358,541, filed Dec. 14, 1994 which was abandoned upon the filing hereof; which is a continuation-in-part of application Ser. No. 08/120,759, filed Sep. 15, 1993 which was abandoned upon the filing hereof.

FIELD OF THE INVENTION AND RELATED ART STATEMENT

This invention relates to a process for removing carbon dioxide ($CO_2$) from combustion gases. More particularly, it relates to a process for removing $CO_2$ from combustion gases using an aqueous hindered amine solution without obstructing the process operation but with good energy efficiency.

In recent years the greenhouse effect of $CO_2$ has attracted attention as a factor responsible for the global warming. Counteracting this effect is urgently needed throughout the world to protect the global environment. The source of $CO_2$ is omnipresent in the whole areas of human activities that involve the combustion of fossil fuels, and the tendency is toward stricter emission control than heretofore. In view of these, energetic studies are under way on the removal and recovery of $CO_2$ from combustion gases by contacting them with alkanolamine etc., especially from those emitted by power-generating installations such as steam power plants that burn enormous quantities of fossil fuels, and on the storage of the recovered $CO_2$ without release to the atmosphere.

Examples of the alkanolamine are monoethanolamine, diethanolamine, triethanolamine, methyldiethanolamine, diisopropanolamine, and diglycolamine. Usually, monoethanolamine (MEA) is used by preference.

Aqueous solutions of these alkanolamines, typified by MEA, have been used as absorbent solutions for the absorption and removal of $CO_2$ from combustion gases. However, they have not always proved satisfactory in view of the quantity and velocity of $CO_2$ absorption per given quantity of each aqueous amine solution at a given concentration, and the thermal energy required for the regeneration of the spent aqueous alkanolamine solution after the absorption. Under the circumstances, aqueous hindered amine solutions are considered promising as absorbent solutions capable of overcoming the foregoing problems in place of the aqueous alkanolamine solutions.

OBJECT AND SUMMARY OF THE INVENTION

Substituting an aqueous hindered amine solution for the aqueous alkanolamine solution solves the problems associated with the use of the latter to a substantial extent. Nevertheless, the application of the new solution direct to the $CO_2$-removal process designed for the alkanolamine solution would present additional problems.

An aqueous hindered amine solution that has absorbed $CO_2$ tends to begin the liberation of the absorbed $CO_2$ at a relatively-low temperature compared with the liberation by an aqueous MEA solution. It is seemingly advantageous because of potential reduction of the energy requirement for regeneration. However, at the stage of preheating of the $CO_2$-containing absorbent solution on its way toward the regeneration column by heat exchange with the regenerated solution being recycled from the regeneration column to the absorption column, the above phenomenon causes partial liberation of the absorbed $CO_2$. If the liberation were allowed to progress unchecked, the power for pumping the $CO_2$-containing absorbent solution to the regeneration column would have to be increased accordingly. In an extreme case the pump would become difficult to run. Moreover, a larger heat exchanger would have to be installed to make up for the waning efficiency of the existing exchanger. It, in turn, would cause additional problems such as the demand for a reheater (reboiler) that yields a greater quantity of heat for the regeneration column.

The present inventors have eagerly investigated those new problems that arise from the use of an aqueous hindered amine solution as an absorbent solution for the removal of $CO_2$ from combustion gases. It has now been found, as a result, that those problems can be overcome by the provision of a step of preheating the absorbent solution that has absorbed $CO_2$ and is being sent to the regeneration column with a regenerated absorbent solution and separating partially liberated $CO_2$ and that an energy-saving process can be realized making most of the $CO_2$ absorption capacity of the aqueous hindered amine solution. On the basis of these findings the present invention has now been perfected.

As a method of removing $CO_2$ and/or $H_2S$ from the gas produced by coal gasification, coke oven gas, natural gas, synthetic gas, etc., Japanese Patent Publication No. HEI 4-21521 discloses a technique of absorbing the $CO_2$, etc. with an alkanolamine absorbent solution and regenerating the solution that has absorbed $CO_2$, etc. and has reached a high pressure of 5–110 bars by reducing the pressure stepwise. However, there is nothing suggestive in the publication as to the technique of heating a $CO_2$-containing absorbent solution at atmospheric pressure for $CO_2$ separation and partial regeneration of the solution as taught by the present invention.

The present invention, in the first place, provides a process for removing $CO_2$ from a combustion gas which comprises the steps of removing $CO_2$ from the combustion gas through contact of an aqueous hindered amine solution used as a $CO_2$ absorbent solution with the combustion gas at atmospheric pressure and then, in a regeneration column, liberating $CO_2$ from the absorbent solution that has absorbed $CO_2$ and thereby regenerating the absorbent solution, the process further comprising a partial absorbent solution regeneration step in at least one stage wherein the absorbent solution that has absorbed $CO_2$ is heated through heat exchange with a high-temperature regenerated absorbent solution and part of the $CO_2$ that is liberated is separated from the absorbent solution, after which the partially regenerated absorbent solution thus obtained is heated and fed to a regeneration column further to liberate $CO_2$ from the partially regenerated absorbent solution and regenerate the absorbent solution.

In the second place, the invention provides a process for removing $CO_2$ from a combustion gas which comprises the steps of removing $CO_2$ from the combustion gas through contact of an aqueous hindered amine solution used as a $CO_2$ absorbent solution with the combustion gas at atmospheric pressure and then, in a regeneration column, liberating $CO_2$ from the absorbent solution that has absorbed $CO_2$ and thereby regenerating the absorbent solution, the process further comprising a partial absorbent solution regeneration step in at least one stage wherein the absorbent solution that has absorbed $CO_2$ is heated through heat exchange with a high-temperature regenerated absorbent solution and part of the $CO_2$ that is liberated is separated from the absorbent solution, after which part of the partially regenerated absorbent solution thus obtained is returned to the step of removing $CO_2$ from the combustion gas for use as part of the $CO_2$ absorbent solution while the rest of the partially regenerated absorbent solution is heated and fed to a regeneration column further to liberate $CO_2$ from the partially regenerated absorbent solution and regenerate the absorbent solution.

In the third place, the invention provides a process set forth in the second place above wherein the partial absorbent solution regeneration step uses a distillation column (hereinafter called a "partial regeneration column").

In the fourth place, the invention provides a process set forth in the third place above wherein the distillation column is fed with a gas produced by heating in a reboiler for the regeneration column, a gas containing the $CO_2$ liberated in the regeneration column, or steam from the outside of the system.

The invention will now be described in more detail.

A desirable hindered amine for use in this invention is, for example, one selected from the following classes of compounds all having in the molecule an alcoholic hydroxyl group and (A) a primary amine group bound to a tertiary carbon atom having two unsubstituted alkyl groups, (B) an unsubstituted alkyl group which contains 3 or fewer carbon atoms and a secondary amine group having an N atom bound to a group which has a chain of two or more carbon atoms including a binding carbon atom, or (C) a tertiary amine group and at least two groups bound to the tertiary amine group, each having a chain of two or more carbon atoms including the binding carbon atom, two of the groups bound to the tertiary amine group being unsubstituted alkyl groups, and also (D) 2-substituted piperidines having a hydroxyl-substituted alkyl group in the 2 position (excluding those having two or more amino groups). In addition, a hindered amine having a molecular weight of 150 or below is preferred from the perspective of the $CO_2$ absorption capacity per unit quantity of the solution at a given concentration.

Out of the hindered amines classified above, (A) the compounds having a primary amine group bound to a tertiary carbon atom having two unsubstituted alkyl groups are such that the unsubstituted alkyl groups may be the same or different. Those groups may be methyl, ethyl, propyl or other group each, preferably the both being methyl groups.

The compounds that fall under the category (A) are, e.g., 2-amino-2-methyl-1-propanol (AMP), 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol, and 2-amino-2-methyl-1-pentanol. Among these, AMP is preferable.

Of the above hindered amines, (B) the compounds having an unsubstituted alkyl group which contains 3 or fewer carbon atoms and a secondary amine group having an N atom bound to a group which has a chain of two or more carbon atoms including a binding carbon atom are, e.g., 2-(ethylamino)-ethanol, 2-(methylamino)-ethanol, 2-(propylamino)-ethanol, 2-(isopropylamino)-ethanol, 1-(ethylamino)-ethanol, 1-(methylamino)-ethanol, 1-(propylamino)-ethanol, and 1-(isopropylamino)-ethanol. Especially, 2-(ethylamino)-ethanol (EAE) and 2-(methylamino)-ethanol (MAE) are preferred.

In the hindered amines of the class (C), i.e., the compounds having a tertiary amine group and at least two groups bound to the tertiary amine group, each having a chain of two or more carbon atoms including the binding carbon atom, two of the groups bound to the tertiary amine group being unsubstituted alkyl groups, the two unsubstituted alkyl groups may be the same or different, e.g., methyl, ethyl, propyl, isopropyl, or/and other similar groups.

Examples of these compounds are 2-(dimethylamino)ethanol, 2-(diethylamino)-ethanol, 2-(ethylmethylamino)ethanol, 1-(dimethylamino)-ethanol, 1-(diethylamino)ethanol, 1-(ethylmethylamino)-ethanol, 2-(diisopropyl-amino)-ethanol, 1-(diethylamino)-2-propanol, and 3-(diethylamino)-1-propanol. Particularly desirable is 2-(dimethylamino)-ethanol (DEAE).

Of the hindered amines, (D) the 2-substituted piperidines having a hydroxyl-substituted alkyl group in the 2 position include 2-(hydroxymethyl)-piperidine, 2-(2-hydroxyethyl)-piperidine, and 2-(1-hydroxyethyl)-piperidine. Among these, 2-(2-hydroxyethyl)-piperidine (HEP) is preferred.

The hindered amine or amines chosen from among these classes may be used singly or as a mixture. The concentration of the aqueous hindered amine solution to be used as an absorbent solution usually ranges from 15 to 65 wt % depending on the type of the hindered amine or amines used. The temperature of the aqueous hindered amine solution in contact with combustion gas is usually in the range of 30°–70° C.

The aqueous hindered amine solution may contain a reaction accelerator to speed up the absorption reaction, a corrosion inhibitor, a deterioration-retarding agent for the hindered amine, or/and other additives as needed. Typical accelerators are piperazine, piperidine, morpholine, glycine, 2-(methylamino)-ethanol, 2-(hydroxyethyl)piperidine (except when used as a hindered amine), and 2-(ethylamino)-ethanol. The amount of the accelerator used is usually between 1 and 25 part by weight per 100 parts by weight of the hindered amine.

For the purposes of the invention the term "atmospheric pressure" used here encompasses the pressures in the neighborhood of the atmospheric that permit the operation of a blower or the like to feed a combustion gass to the system.

The first feature of the present invention is that a partial absorbent solution regeneration step in at least one stage is provided wherein the absorbent solution that has absorbed $CO_2$ is heated through heat exchange with a regenerated absorbent solution at a higher temperature and part of the $CO_2$ that is liberated is separated from the absorbent solution, after which the partially regenerated absorbent solution thus obtained is heated and fed to a regeneration column further to liberate $CO_2$ from the partially regenerated absorbent solution and regenerate the absorbent solution. For the step of separating $CO_2$ and absorbent solution in at least one stage, a $CO_2$-separating drum is usually used.

The process to which the present invention with the foregoing feature can be incorporated is not specially limited. A typical case will now be described with reference to FIG. 1. FIG. 1 shows only major component units, omitting ancillary equipment.

Referring to FIG. 1, the numeral 1 indicates a combustion gas feed line; 2, a $CO_2$-removal column; 3, a $CO_2$-free combustion gas outlet; 4, 7, 13, and 19, pumps; 5, 8, and 14, heat exchangers; 6, a $CO_2$-separating drum; 9, an absorbent solution regeneration column (regeneration column); 10, a reboiler; 11, a regenerated absorbent solution reflux line; 12, an absorbent solution surge drum; 15, a separated-$CO_2$-discharging line; 16, a regeneration column reflux condenser; 17, a $CO_2$-separating drum; 18, a recovered-$CO_2$-discharging line; and 20, a regeneration column refluxing water feed line.

In FIG. 1, a combustion gas properly pretreated and adjusted in temperature is introduced through the combustion gas feed line 1 into the $CO_2$-removal column 2. The combustion gas forced into the $CO_2$-removal column 2 comes in countercurrent contact with an absorbent solution at a given temperature and concentration being supplied from the top of the column. The absorbent solution removes $CO_2$ by absorption from the combustion gas, and the $CO_2$-free combustion gas is discharged through the $CO_2$-free combustion gas outlet 3 to the atmosphere. Meanwhile the absorbent solution supplied to the $CO_2$-removal column 2 absorbs $CO_2$ and, because of the heat of reaction upon the absorption, it reaches a higher temperature than the normal temperature at which it is supplied. The solution is then sent by the discharging pipe 4 to the heat exchanger 5, where it is additionally heated by a regenerated absorbent solution at a higher temperature conducted from the regeneration column 9 to be described later.

According to the present invention, which uses an absorbent solution consisting of an aqueous hindered amine solution, part of the $CO_2$ contained in the absorbent solution is liberated in the heat exchanger 5 where the solution is heated by the heat exchange with the regenerated absorbent solution. That part of $CO_2$ undergoes a phase change from liquid to gas, thus providing, on the whole, a mixed liquid-gas phase. The degree to which the solution is additionally heated is such that the temperature of the absorbent solution comes to the level usually 20° to 60° C. higher than the solution temperature at the outlet of the $CO_2$-removal column 2. The absorbent solution in the state of mixed phase is led to the $CO_2$-separating drum 6, where it is separated into $CO_2$ and a partially regenerated absorbent solution. The $CO_2$ is transferred through the separated-$CO_2$-discharging line 15 to the regeneration column reflux condenser 16. When necessary, a control valve may be provided between the heat exchanger 5 and the $CO_2$-separating drum 6 for the flushing purpose.

The partially regenerated absorbent solution separated from the liberated $CO_2$ is sent by the pump 7 to the heat exchanger 8 where it is reheated, and then led to the regeneration column 9. Here, if necessary, the partial regeneration step with the heat exchanger 5 and the $CO_2$-separating drum 6 may be repeated between the $CO_2$-separating drum 6 and the heat exchanger 8.

Under the invention the $CO_2$-separating drum 6 removes $CO_2$ to some extent from the absorbent solution, and the temperature of the partially regenerated absorbent solution decreases accordingly. The heat exchanger 8, therefore, is enabled to provide a sufficient temperature difference with the regenerated absorbent solution to achieve an improved heat exchange efficiency. This, in turn, lessens the burden on the reboiler 10 for the regeneration column 9.

In the regeneration column 9, heat from the reboiler 10 liberates $CO_2$ from the absorbent solution, thus regenerating the solution. The regenerated absorbent solution is cooled by the heat exchanger 8, surge drum 12, and heat exchangers 5, 14 and returned to the $CO_2$-removal column 2. In the upper space of the regeneration column 9, the $CO_2$ liberated from the absorbent solution is merged with the $CO_2$ from the $CO_2$-separating drum 6. The whole $CO_2$ is cooled in the regeneration column reflux condenser 16 and then, in the $CO_2$ separator 17, it is separated from the refluxing water that is formed by condensation of the water vapor that has been entrained by the $CO_2$ stream. Subsequently the $CO_2$ stream is conducted to the $CO_2$ recovering step through the recovered-$CO_2$ discharging line 18. The refluxing water is recycled by the refluxing water pump 19 to the top of the regeneration column 9.

A modified process of the present invention is illustrated in FIG. 2. It differs from the process of FIG. 1 in that the partially regenerated absorbent solution is returned by the pump 7 to an intermediate region of the $CO_2$-removal column 2 by way of a refluxing line 21 and heat exchangers 22, 23. Freed from $CO_2$ to some extent, the partially regenerated absorbent solution now regains the $CO_2$ absorption capacity. It is not totally regenerated in the regeneration column 9 but is partly recycled to the $CO_2$-removal column 2 and reused in the absorption of $CO_2$ from the combustion gas. This is the second feature of the present invention.

Since the regenerated absorbent solution from the regeneration column 9 is supplied to the top of the $CO_2$-removal column 2, the regeneration energy required for the regeneration column 9 can be decreased without practically reducing the $CO_2$ absorption capacity of the $CO_2$-removal column 2.

Yet another modified process incorporating the invention is shown in FIG. 3. A major feature that distinguishes it from the process of FIG. 2 is the use of a distillation column (partial regeneration column) 24 in place of the $CO_2$-separating drum 6. Many component units in FIG. 3 play the same roles, despite some dissimilarities in process flow, as in FIG. 2, and the parts like those in FIG. 2 are like numbered. In the process of FIG. 3, the absorbent solution that has taken up $CO_2$ is discharged from the bottom of the $CO_2$-removal column 2 by the pump 4, reheated by the heat exchangers 22 and 5, and led to the partial regeneration column 24.

To the bottom of the partial regeneration column 24 is connected a line 25 capable of supplying a part of the liberated-$CO_2$-containing gas from the regeneration column 9 (regenerator-produced gas). This gas contains water vapor together with $CO_2$ at a high temperature and serves as a stripping gas that liberates $CO_2$ by steam stripping from the absorbent solution that is introduced into the partial regeneration column 24. Depending on the type of the hindered amine used, however, the $CO_2$ partial pressure can sometimes be too high, because of the $CO_2$-aqueous hindered amine solution equilibrium in the gas, for the fully effective use of the gas for the $CO_2$ liberation (partial regeneration) in the partial regeneration column.

The $CO_2$ in the absorbent solution introduced into the partial regeneration column 24 can be liberated by steam stripping by another stripping gas. The high-temperature gas produced in the reboiler 10 as the heat source for the regeneration column 9 is supplied via a gas supply line 26 and utilized together with the afore-said stripping gas. This gas, like that produced in the regeneration column, contains water vapor and $CO_2$. As still another stripping gas for the partial regeneration column 24, steam from the outside of the system may be used through a supply line 27. The use of steam from the outside is advantageous because it is free from $CO_2$ and does not increase the partial pressure of $CO_2$ in the gas phase inside the partial regeneration column 24 and, moreover, it serves as a heat source for the partial regeneration column 24. The drawbacks are that an additional energy has to be used and that the steam used disrupts the water balance in the system, increasing the volume of condensate, e.g., in the $CO_2$-separating drum 17, necessitating an additional step of water draining. Because of its $CO_2$ content the water to be drained cannot be used directly as feed water to the boiler or other units. In any case, depending on the absorption capacity of the hindered amine used, the above-mentioned stripping gases may be used singly or as a mixture of two or more.

In the process of FIG. 3 too, the partially regenerated absorbent solution is recycled to the $CO_2$-removal column 2.

The regeneration rate of the partially regenerated absorbent solution is usually between 30 and 70% on the assumption that the regeneration rate of the solution from the regeneration column 9 is 100%.

As has been described in detail, the process of the present invention settles the problems associated with the direct use of an aqueous hindered amine solution in a process designed to use a conventional aqueous MEA solution; i.e., an increase in the pump power requirement for the supply of the absorbent solution to the regeneration column or, in extreme cases, difficulty of pumping; and an increased heat requirement by the reheater (reboiler) for the regeneration column, or the need of a larger heat exchanger or exchangers.

Also, the utilization of the partially regenerated absorbent solution as a part of the absorbent solution for use in the $CO_2$-removal column renders it possible to reduce the overall energy consumption of the regeneration column.

DETAILED DESCRIPTION OF PREFERRED EMBODIMENTS

The present invention is concretely described in connection with the following examples.

EXAMPLE 1

Figure 1:
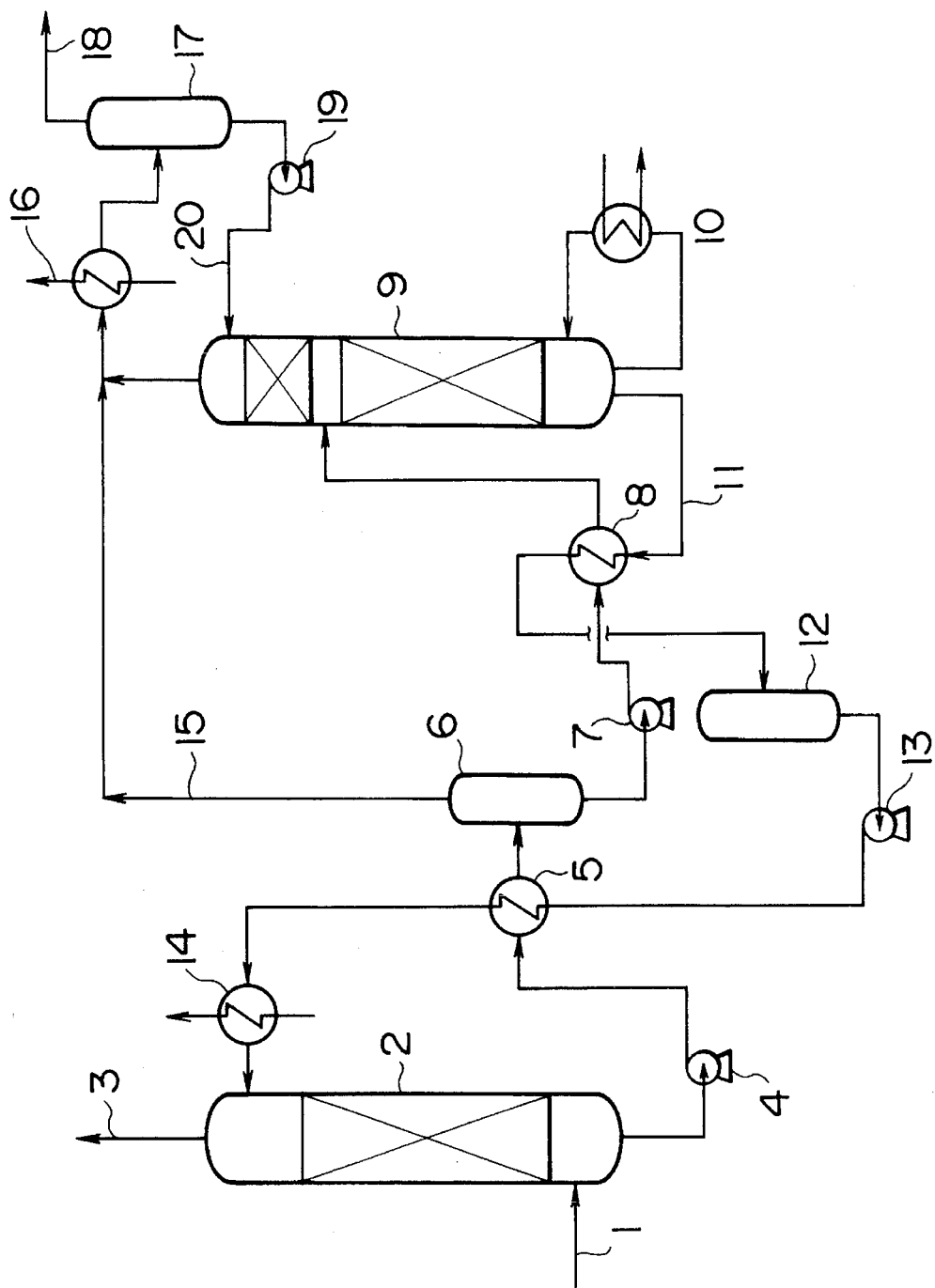
FIG. 1 is a block diagram of a $CO_2$ removal process incorporating the present invention.
Figure 2:
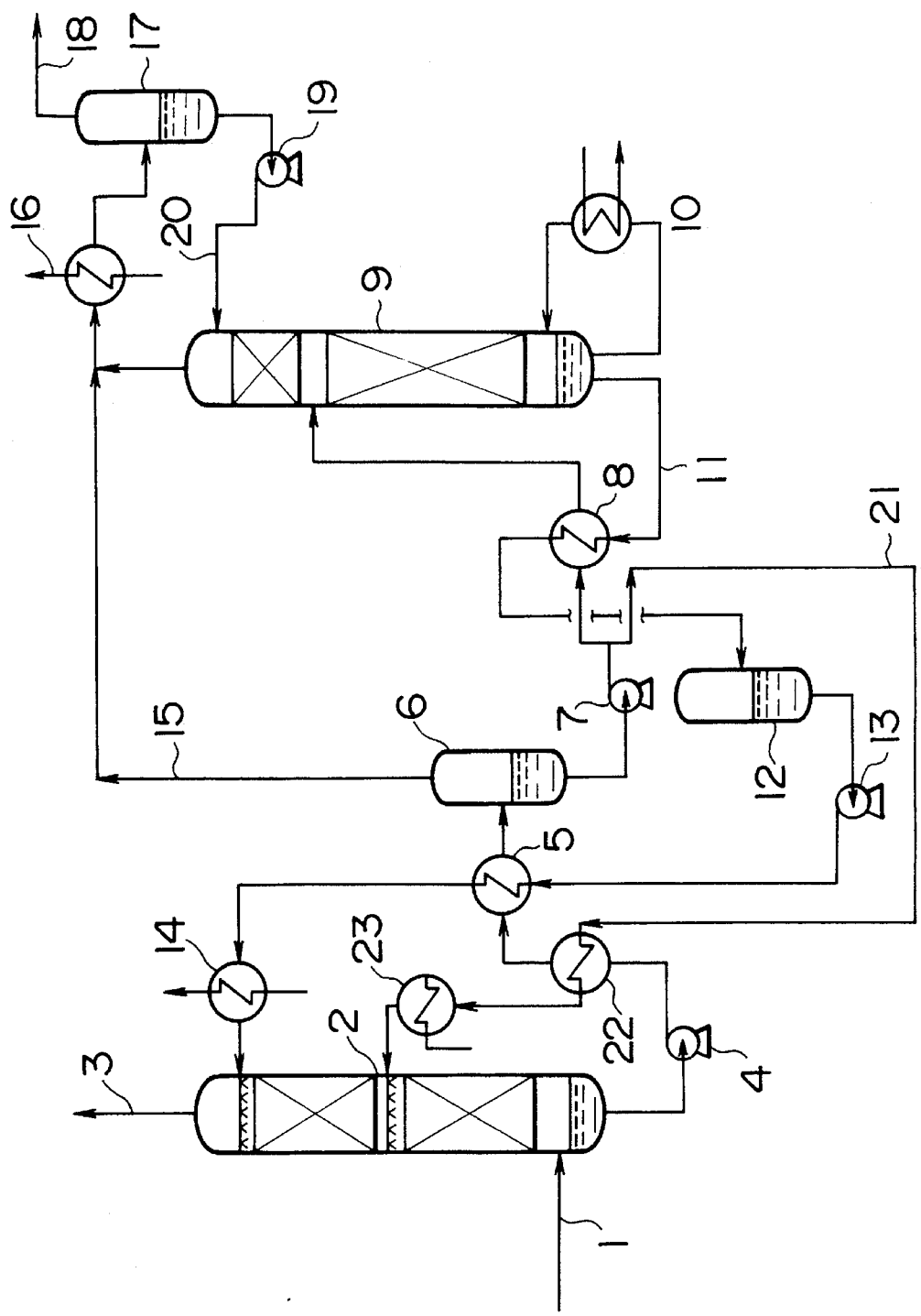
FIG. 2 is a block diagram of a modified $CO_2$ removal process incorporating the present invention.

A small-scale test was conducted about the removal of $CO_2$ from a combustion gas using the apparatus shown in FIG. 1, to predict how the $CO_2$ is liberated from the absorbent solution upon heating by the heat exchanger 5 following the $CO_2$ absorption by the $CO_2$-removal column 2. The testing procedure was as follows:

Into a glass reactor placed in a thermostatic chamber was placed 50 ml of an aqueous solution containing 30 wt % of a hindered amine. A test gas was passed at a flow rate of 1 l/min through the aqueous solution while the latter was being stirred at 40° C. The test gas used was a model of combustion gas at 40° C. composed of 10 mol % $CO_2$, 3 mol % $O_2$, and 87 mol % $N_2$.

The test gas was continuously passed until the $CO_2$ concentrations at the inlet and outlet became equal. At that point the $CO_2$ content in the absorbent solution was measured using a $CO_2$ analyzer (total organic carbon meter) and the $CO_2$ saturation absorption rate was found. A similar test was repeated at 60° C. and 80° C.

Figure 4:
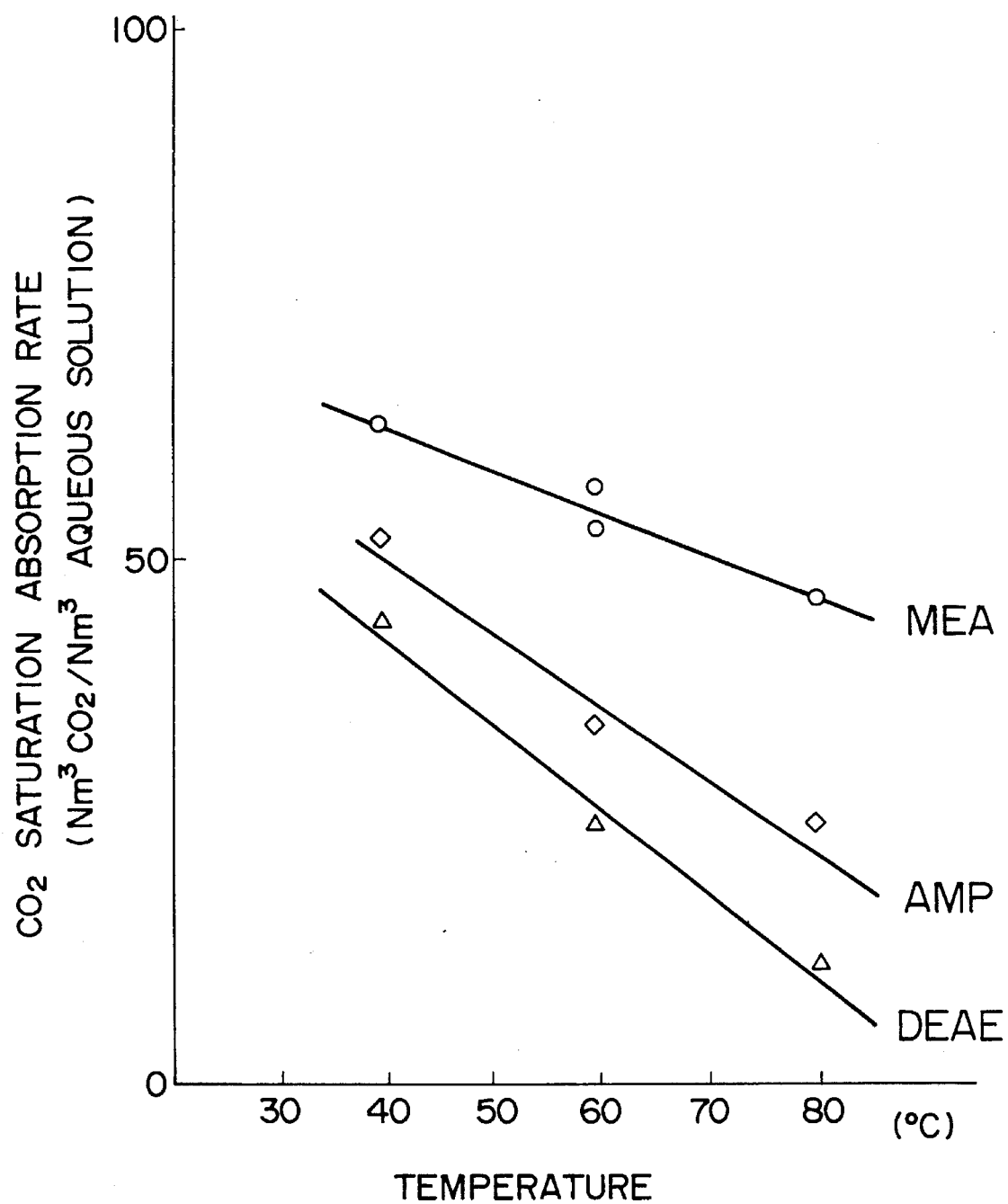
FIG. 4 is a chart showing the temperature dependence of the $CO_2$ absorption capacities of aqueous hindered amine solutions.

The results are graphically represented in FIG. 4. The vertical axis in FIG. 4 is in the unit of $Nm^3 CO_2/Nm^3$ aqueous solution and the horizontal axis is the temperature (°C.). It can be easily seen from FIG. 4 that with the absorbent solutions of hindered amines, AMP and DEAE, the temperature dependence of the $CO_2$ saturation absorption rate is greater than with the absorbent solution of MEA, and that the absorbent solution using DEAE liberates most absorbed $CO_2$ at 80° C. Thus it may safely be predicted that, when either of these aqueous hindered amine solutions is used in the process of FIG. 1, the $CO_2$ liberation in the heat exchanger 5 is so vigorous that the pump 7 becomes very difficult to run and the capacity of the heat exchanger 8 declines seriously unless the $CO_2$-separating drum 6 is provided. On the other hand, it will be appreciated that such an aqueous hindered amine solution, as used in the process of FIG. 1, performs the absorption of $CO_2$ from combustion gases without causing any trouble in the operation of pumps or heat exchangers.

EXAMPLE 2

Figure 3:
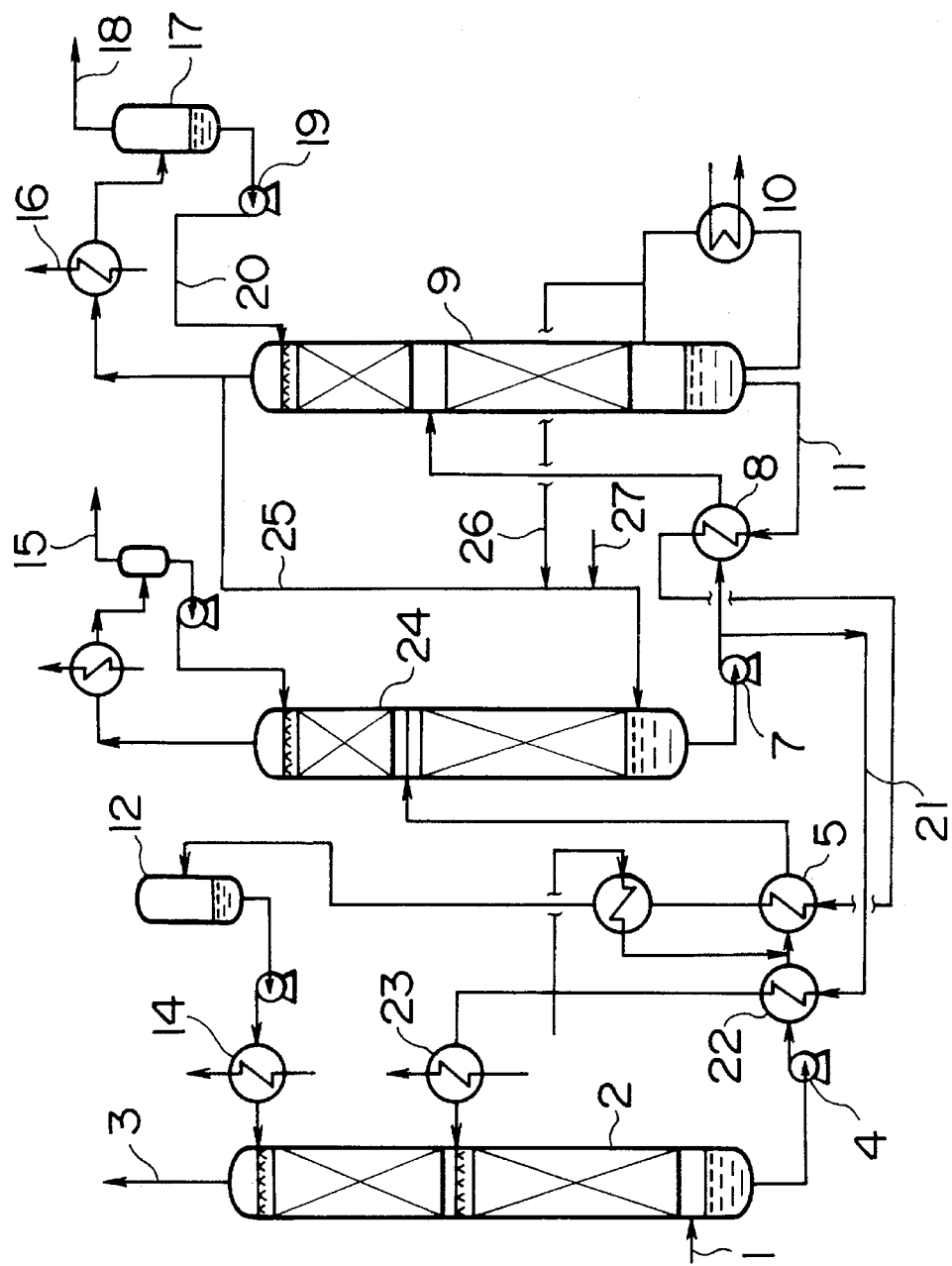
FIG. 3 is a block diagram of yet another modified $CO_2$ removal process incorporating the present invention.

The quantity of heat required for the regeneration of the absorbent solution used in the process of FIG. 3 was calculated from the data of temperature dependence of $CO_2$ saturation absorption rate of the aqueous AMP solution shown in FIG. 4. Prerequisites for the calculation were as follows:

(1) The composition of the absorbent solution at 55° C. after $CO_2$ absorption is: AMP, 100 kg mol/h; water, 1154 kg mol/h; and $CO_2$, 40 kg mol/h. Hence the absorption rate is 0.4 mol $CO_2$ per mol AMP.

(2) The temperature of the absorbent solution at the inlet of the partial regeneration column is 80° C.

(3) The separated $CO_2$ from the top of the partial regeneration column is at the atmospheric pressure, $CO_2$ being 17.5 kg mol/h.

(4) The temperature of the partially regenerated absorbent solution at the inlet of the regeneration column is 110° C.

(5) The percentage of the absorbent solution supplied to the regeneration column for the partially regenerated absorbent solution is 50%.

(6) The temperature at the outlet of the regeneration column of the absorbent solution to be returned to the $CO_2$-removal column is 120° C.

(7) The regenerated absorbent solution to be returned to the $CO_2$-removal column has a $CO_2$ concentration of 0.1 mol $CO_2$/AMP mol and a temperature of 40° C. Similarly, the partially regenerated absorbent solution has a $CO_2$ concentration of 0.225 mol $CO_2$/AMP mol and a temperature of 40° C.

(8) The separated $CO_2$ from the top of the regenerated column has a pressure of 1.5 ata and is in an amount of 12.5 kg mol/h.

(9) The quantity of water vapor obtained from the gas produced by heating in the regeneration column reboiler and which is supplied to the partial regeneration column is 38.4 kg mol/h.

(10) The specific heat of an absorbent solution containing 30 wt % AMP is 0.9 cal/g.

In this case the quantity of heat required for the reboiler of the regeneration column was calculated to be approximately $8.30 \times 10^5$ kcal/h.

By way of comparison, the quantity of heat required for the regeneration column reboiler when the absorbent solution that absorbed $CO_2$ was fed to the regeneration column directly rather than via the partial regeneration column was calculated. The prerequisites (1), (4), (6), (7) (regenerated absorbent solution), and (10) were assumed to be unchanged.

As a result, the quantity was found to be $10.6 \times 10^5$ kcal/h.

We claim:

1. A process for removing $CO_2$ from a combustion gas which comprises the steps of removing $CO_2$ from the combustion gas through contact of an aqueous hindered amine solution used as a $CO_2$ absorbent solution with the combustion gas at atmospheric pressure and then, in a regeneration column, liberating $CO_2$ from the absorbent solution that has absorbed $CO_2$ and thereby regenerating the absorbent solution, the process further comprising an absorbent solution partial regeneration step in at least one stage, carried out at atmospheric pressure, wherein the absorbent solution that has absorbed $CO_2$ is heated indirectly through heat exchange with a high-temperature regenerated absorbent solution and is forwarded to a carbon dioxide separation step where part of the $CO_2$ is liberated from the absorbent solution, after which the partially regenerated absorbent solution thus obtained is heated and fed to a regeneration column further to liberate $CO_2$ from the partially regenerated absorbent solution and regenerate the absorbent solution.

2. A process for removing $CO_2$ from a combustion gas which comprises the steps of removing $CO_2$ from the combustion gas through contact of an aqueous hindered amine solution used as a $CO_2$ absorbent solution with the combustion gas at atmospheric pressure and then, in a regeneration column, liberating $CO_2$ from the absorbent solution that has absorbed $CO_2$ and thereby regenerating the absorbent solution, the process further comprising an absorbent solution partial regeneration step in at least one stage, carried out at atmospheric pressure, wherein the absorbent solution that has absorbed $CO_2$ is heated indirectly through heat exchange with a high-temperature regenerated absorbent solution and is forwarding to a carbon dioxide separation step where part of the $CO_2$ is liberated from the absorbent solution, after which part of the partially regenerated absorbent solution thus obtained is returned to the step of removing $CO_2$ from the combustion gas for use as part of the $CO_2$ absorbent solution while the rest of the partially regenerated absorbent solution is heated and fed to a regeneration column further to liberate $CO_2$ from the partially regenerated absorbent solution and regenerate the absorbent solution.

3. In a process for removing $CO_2$ from a combustion gas which comprises removing $CO_2$ from the combustion gas through contact of a $CO_2$ absorbent solution with the combustion gas and then, in a regeneration column, liberating $CO_2$ from the absorbent solution that has absorbed $CO_2$ and thereby regenerating the absorbent solution, the improvement which consists essentially of:

(a) partially regenerating an aqueous hindered amine absorbent solution which has absorbed carbon dioxide in at least one partial regeneration step, at atmospheric pressure, by indirectly heating the absorbent solution through heat exchange with a high-temperature regenerated absorbent solution, and forwarding the absorbent solution to a carbon dioxide separation step to liberate part of the absorbed $CO_2$ from the absorbent solution to obtain a partially regenerated absorbent solution;

(b) heating the partially regenerated absorbent solution obtained in step (a) and feeding the partially regenerated absorbent solution to the regeneration column;

(c) liberating further $CO_2$ from the partially regenerated absorbent solution of step (b); and (d) obtaining a regenerated absorbent solution.

4. In a process for removing $CO_2$ from a combustion gas which comprises removing $CO_2$ from the combustion gas through contact of a $CO_2$ absorbent solution with the combustion gas and then, in a regeneration column, liberating $CO_2$ from the absorbent solution that has absorbed $CO_2$ and thereby regenerating the absorbent solution, the improvement which consists essentially of the steps of:

(a) partially regenerating an aqueous hindered amine absorbent solution which has absorbed carbon dioxide in at least one partial regeneration step, at atmospheric pressure, by indirectly heating the absorbent solution through heat exchange with a high-temperature regenerated absorbent solution, and forwarding the absorbent solution to a carbon dioxide separation step to liberate part of the absorbed $CO_2$ from the absorbent solution to obtain a partially regenerated absorbent solution;

(b) obtaining a portion of the partially regenerated absorbent solution from step (a);

(c) returning the portion of the partially regenerated absorbent solution from step (b) to the step of removing carbon dioxide from the combustion gas;

(d) heating a remaining portion of the partially regenerated absorbent solution from step (c) and feeding the remaining portion of the partially regenerated absorbent solution to the regenerator column;

(e) liberating further $CO_2$ from the remaining portion of the partially regenerated absorbent solution; and (f) obtaining a regenerated absorbent solution.

5. The process as claimed in claim 2, wherein the partial absorbent solution regeneration step uses a distillation column.

6. The process as claimed in claim 5, wherein the distillation column is fed with a gas produced by heating in a reboiler for the regeneration column, a gas containing the $CO_2$ liberated in the regeneration column, or steam from the outside of the system.

\* \* \* \* \*